United States Patent
Fedeyko et al.

(12)

(10) Patent No.: US 10,807,082 B2
(45) Date of Patent: *Oct. 20, 2020

(54) ZEOLITE CATALYST CONTAINING METALS

(71) Applicant: Johnson Matthey Public Limited Company, London (GB)

(72) Inventors: Joseph Michael Fedeyko, Wayne, PA (US); Hai-Ying Chen, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,921

(22) Filed: Mar. 29, 2019

(65) Prior Publication Data
US 2019/0224657 A1 Jul. 25, 2019

Related U.S. Application Data

(63) Continuation of application No. 14/394,230, filed on Oct. 13, 2014, now Pat. No. 10,245,582.

(51) Int. Cl.
| | | |
|---|---|---|
| *B01J 29/06* | (2006.01) |
| *B01J 29/76* | (2006.01) |
| *B01J 37/03* | (2006.01) |
| *B01J 35/00* | (2006.01) |
| *F01N 3/10* | (2006.01) |
| *B01J 29/72* | (2006.01) |
| *B01J 37/30* | (2006.01) |
| *B01J 23/78* | (2006.01) |
| *B01D 53/94* | (2006.01) |
| *B01J 37/02* | (2006.01) |
| *B01J 35/02* | (2006.01) |
| *B01J 35/04* | (2006.01) |

(52) U.S. Cl.
CPC ........ *B01J 29/763* (2013.01); *B01D 53/9418* (2013.01); *B01J 23/78* (2013.01); *B01J 29/723* (2013.01); *B01J 35/002* (2013.01); *B01J 35/0006* (2013.01); *B01J 35/0073* (2013.01); *B01J 35/023* (2013.01); *B01J 35/04* (2013.01); *B01J 37/0244* (2013.01); *B01J 37/0246* (2013.01); *B01J 37/031* (2013.01); *B01J 37/036* (2013.01); *B01J 37/038* (2013.01); *B01J 37/30* (2013.01); *F01N 3/10* (2013.01); *B01D 2255/202* (2013.01); *B01D 2255/204* (2013.01); *B01D 2255/20738* (2013.01); *B01D 2255/20761* (2013.01); *B01D 2255/50* (2013.01); *B01D 2257/40* (2013.01); *B01D 2257/404* (2013.01); *B01D 2258/012* (2013.01); *B01J 2229/186* (2013.01)

(58) Field of Classification Search
CPC .. B01J 29/723; B01J 29/763; B01J 2229/186; B01J 35/0073; B01J 37/031; B01J 37/038; B01J 37/036; B01J 37/30; B01D 53/9418; B01D 2255/50; B01D 2257/40; B01D 2257/404; B01D 2258/012; F01N 3/10
USPC ............... 502/60, 73, 74; 422/177, 180; 423/213.2, 213.5
See application file for complete search history.

(56) References Cited

U.S. PATENT DOCUMENTS

| | | | | |
|---|---|---|---|---|
| 4,046,888 A * | 9/1977 | Maeshima | ......... | B01D 53/8625 423/239.1 |
| 5,589,147 A * | 12/1996 | Farnos | ............... | B01D 53/8621 423/239.2 |
| 7,943,097 B2 * | 5/2011 | Golden | .............. | B01D 53/8628 422/180 |
| 8,535,629 B2 * | 9/2013 | Ballinger | ........... | B01D 53/9418 423/213.2 |
| 8,906,329 B2 * | 12/2014 | Ballinger | ........... | B01D 53/9418 423/213.2 |
| 8,906,820 B2 * | 12/2014 | Fedeyko | ............ | B01D 53/9418 502/60 |
| 8,961,914 B2 * | 2/2015 | Mohanan | ............... | B01J 29/763 423/213.2 |
| 9,517,458 B2 * | 12/2016 | Li | ............................ | B01J 29/88 |
| 2011/0020204 A1 * | 1/2011 | Bull | .................... | B01D 53/9418 423/239.2 |
| 2011/0165051 A1 * | 7/2011 | Beutel | ................ | B01D 53/9418 423/239.2 |

FOREIGN PATENT DOCUMENTS

| | | | |
|---|---|---|---|
| EP | 0 415 401 | * | 11/1995 |
| EP | 2 659 973 | * | 6/2013 |
| WO | WO 2011/073390 | * | 6/2011 |

* cited by examiner

*Primary Examiner* — Elizabeth D Wood

(57) ABSTRACT

Provided is catalyst material useful for the selective catalytic reduction of NOx in lean burn exhaust gas, wherein the catalyst material is a hydrothermally stable, low SAR aluminosilicate zeolite loaded with a synergistic combination of one or more transition metals, such as copper, and one or more alkali or alkaline earth metals, such as calcium or potassium.

19 Claims, 3 Drawing Sheets

(750 °C Aged)

(900 °C Aged)

ZEOLITE CATALYST CONTAINING METALS

BACKGROUND

A.) Field of Use

The present invention relates to catalysts, systems, and methods that are useful for treating an exhaust gas which occurs as a result of combustion of hydrocarbon fuel, and particularly exhaust gas containing nitrogen oxides, such as an exhaust gas produced by diesel engines.

B.) Description of Related Art

The largest portions of most combustion exhaust gases contain relatively benign nitrogen ($N_2$), water vapor ($H_2O$), and carbon dioxide ($CO_2$); but the exhaust gas also contains in relatively small part noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of these undesirable components, preferably by a process that, in turn, does not generate other noxious or toxic substances.

One of the most burdensome components to remove from a vehicular exhaust gas is NOR, which includes nitric oxide (NO), nitrogen dioxide ($NO_2$), and/or nitrous oxide ($N_2O$). The reduction of NOR to $N_2$ in a lean burn exhaust gas, such as that created by diesel engines, is particularly problematic because the exhaust gas contains enough oxygen to favor oxidative reactions instead of reduction. NOR can be reduced in a diesel exhaust gas, however, by a process commonly known as Selective Catalytic Reduction (SCR). An SCR process involves the conversion of NOR, in the presence of a catalyst and with the aid of a reducing agent, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

$$2NO+4NH_3+2O_2 \rightarrow 3N_2+6H_2O$$

$$2NO_2+4NH_3+O_2 \rightarrow 3N_2+6H_2O$$

$$NO+NO_2+2NH_3 \rightarrow 2N_2+3H_2O$$

Known SCR catalysts include zeolites and other molecular sieves. Molecular sieves are microporous crystalline solids with well-defined structures and generally contain silicon, aluminum and oxygen in their framework and can also contain cations within their pores. A defining feature of a zeolite is its crystalline or pseudo-crystalline structure which is formed by silica and alumina tetrahedral units interconnected via oxygen atoms in a regular and/or repeating manner to form a molecularly porous framework. Unique frameworks recognized by the International Zeolite Association (IZA) Structure Commission are assigned a three-letter code to designate the framework type, such as CHA (chabazite), BEA (beta), and MOR (mordenite).

The molecularly porous frameworks have volumes on the order of a few cubic nanometers and cell openings (also referred to as "pores" or "apertures") on the order of a few angstroms in diameter. The cell openings can be defined by their ring size, where, for example, the term "8-ring" refers to a closed loop that is built from 8 tetrahedrally coordinated silicon (or aluminum) atoms and 8 oxygen atoms. In certain zeolites, the cell pores are aligned within the framework to create one or more channels which extend through the framework, thus creating a mechanism to restrict the ingress or passage of different molecular or ionic species through the molecular sieve, based on the relative sizes of the channels and molecular or ionic species. The size and shape of molecular sieves affect their catalytic activity in part because they exert a steric influence on the reactants, controlling the access of reactants and products. For example, small molecules, such as NOR, can typically pass into and out of the cells and/or can diffuse through the channels of a small-pore molecular sieve (i.e., those having framework with a maximum ring size of eight tetrahedral atoms), whereas larger molecules, such as long chain hydrocarbons, cannot. Moreover, partial or total dehydration of a molecular sieve can results in a crystal structure interlaced with channels of molecular dimensions.

Molecular sieves having a small pore framework, i.e., containing a maximum ring size of 8, have been found to be particularly useful in SCR applications. Small pore molecular sieves include those having the following crystalline structure types: CHA, LEV, ERI, and AEI. Moreover, the relative amounts of alumina and silica in zeolites can be characterized by a silica-to-alumina ratio (SAR). In general, as a zeolite's SAR increases, the zeolite becomes more hydrothermal stability. Since the temperature of an exhaust gas exiting a mobile lean-burn engine, such as a diesel engine, is often 500 to 650° C. or higher and typically contains water vapor, hydrothermal stability is an important consideration in designing an SCR catalyst.

While zeolites per se often have catalytic properties, their SCR catalytic performance may be improved in certain environments by a cationic exchange wherein a portion of ionic species existing on the surface or within the framework is replaced by metal cations, such $Cu^{2+}$. That is, a zeolite's SCR performance can be promoted by loosely holding one or more metal ions to the molecular sieve's framework.

It is also desirable for an SCR catalyst to have high catalytic activity at low operating temperatures. At low operating temperatures, for example below 400° C., a higher metal loading on a molecular sieve results in higher SCR activity. However, the achievable metal loading is often dependent on the quantity of exchange sites in the molecular sieve, which in turn is dependent upon the material's SAR. In general, molecular sieves with low SAR allow for the highest metal loadings, thus leading to a conflict between the need for high catalytic activity (found in low SAR zeolites) and high hydrothermal stability which is achieved by a relatively higher SAR value. Moreover, high copper-loaded catalysts do not perform as well at high temperatures (e.g., >450° C.). For example, loading an aluminosilicate having a CHA framework with large amounts of copper (i.e., copper-to-aluminum atomic ratio of >0.25) can result in significant $NH_3$ oxidation at temperatures over 450° C., resulting in low selectivity to $N_2$. This shortcoming is particularly acute under filter regeneration conditions which involves exposing the catalyst to temperatures above 650° C.

Accordingly, there remains a need for SCR catalysts that offer improved performance over existing SCR materials.

SUMMARY OF THE INVENTION

Applicants have discovered that doping a transition metal promoted aluminosilicate chabazite (CHA) having a relatively low silica-to-alumina ratio (SAR) with an alkali or alkaline earth metal improves the hydrothermal stability of the material. More particularly, the present invention utilizes and/or embodies the surprising discovery that including alkali and alkaline earth metals, such as calcium and potassium, into a transition metal promoted, low SAR chabazite catalyst can substantially increase the hydrothermal stability of the material while maintaining good SCR activity. This result is particularly beneficial for catalyst applied to substrates to form a catalytic component, such as catalyzed diesel particulate filter, of exhaust system for mobile applications. Such catalytic components will likely be subject to atypical events, such as high temperature excursions, during their expected lifetime. Catalysts for mobile applications are preferably designed to withstand such events in order to preserve a majority of their functionality during brief high temperature excursions or at least a portion of their functionality during prolonged high temperature excursions. The benefits of alkali or alkaline earth metal in low SAR zeolites is particularly surprising because conventional zeolites for SCR applications typically favor minimal alkali and alkali metal concentrations to maximize catalytic performance and because a high SAR in aluminosilicates is typically associated with good hydrothermal stability. Moreover, it has been found that this effect is not present in other small pore zeolites, such as ZSM-34. The synergistic effect between alkali/alkaline earth metal concentration, transition metal concentration, and low SAR in chabazite zeolites was heretofore unknown and unexpected.

Accordingly, an aspect of the present invention provides a catalyst composition comprising (a) an aluminosilicate zeolite material comprising silica and alumina in a CHA framework and having a silica-to-alumina mole ratio (SAR) of about 10 to about 25; (b) about 1 to about 5 weight percent of a transition metal ("$T_M$"), such as copper, based on the total weight of the zeolite material, wherein said transition metal disposed in said zeolite material as free and/or extra-framework exchanged metal, and (c) an alkali or alkaline earth metal (collectively "$A_M$"), such as calcium or potassium, disposed in said zeolite material disposed in said zeolite material as free and/or extra-framework exchanged metal, wherein the $T_M$ and $A_M$ are present, respectively, in a molar ratio of about 15:1 to about 1:1. In certain embodiments, the molar ratio of the alumina to the sum of $T_M$ and $A_M$ is greater than about 2:1 and in certain embodiments, the molar ratio of $T_M$ to alumina is less than 0.25:1.

In another aspect of the invention, provided is method for reducing $NO_x$ in an exhaust gas comprising the steps of (a) containing an exhaust gas stream derived from a lean-burn combustion process and containing $NO_x$ and a reducing agent with a catalyst composition described herein; and (b) converting at a portion of said $NO_x$ to $N_2$ and $H_2O$.

DETAILED DESCRIPTION OF PREFERRED EMBODIMENTS OF THE INVENTION

Figure 1:
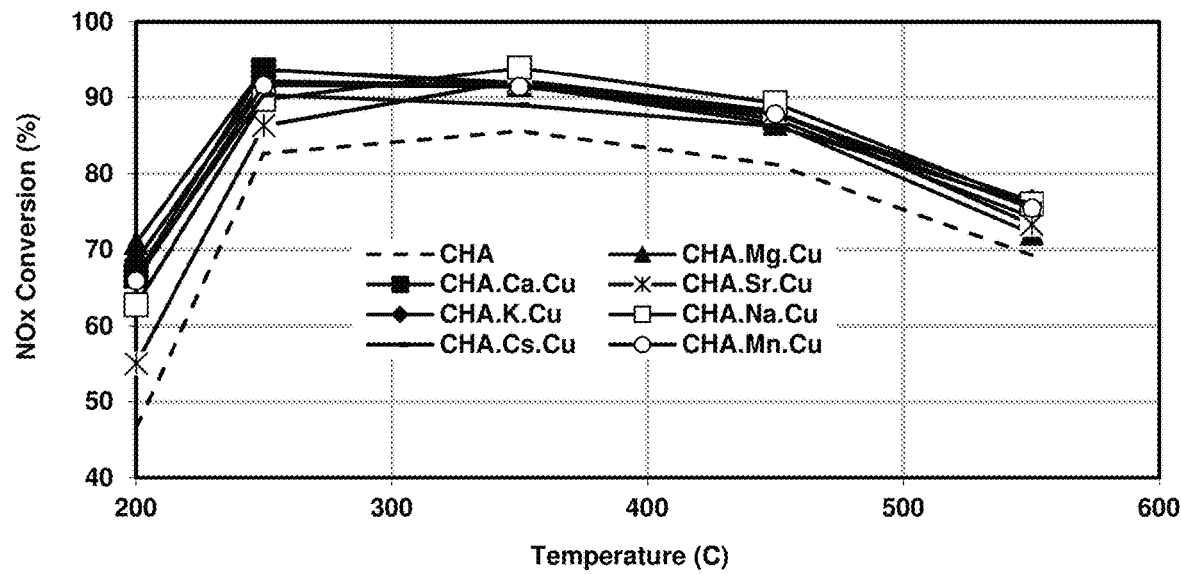
FIG. 1 is a graph depicting $NO_x$ conversion data for certain embodiment of the invention, wherein the catalyst is hydrothermally aged at 750° C.

In a preferred embodiment, the invention is directed to a catalyst for improving environmental air quality, particularly for improving exhaust gas emissions generated by diesel and other lean burn engines. Exhaust gas emissions are improved, at least in part, by reducing $NO_x$ and/or $NH_3$ slip concentrations lean burn exhaust gas over a broad operational temperature range. Useful catalysts are those that selectively reduce $NO_x$ and/or oxidize ammonia in an oxidative environment (i.e., an SCR catalyst and/or AMOX catalyst).

According to a preferred embodiment, provided is a catalyst composition comprising an aluminosilicate zeolite material having a CHA framework and a silica-to-alumina mole ratio (SAR) of about 10 to about 25, and preferably having a mean crystalline size of about 0.5 to about 5 microns; about 1 to about 5 weight percent of a transition metal ("$T_M$"), based on the total weight of the zeolite material, wherein said transition metal disposed in said zeolite material as free and/or extra-framework exchanged metal; and an alkali or alkaline earth metal (collectively "$A_M$") disposed in said zeolite material disposed in said zeolite material as free and/or extra-framework exchanged metal, wherein the $T_M$ and $A_M$ are present, respectively, in a molar ratio of about 15:1 to about 1:1, and preferably wherein the molar ratio of the alumina to the sum of $T_M$ and $A_M$ is greater than about 2:1.

Zeolites of the present invention are aluminosilicates having a crystalline or pseudo crystalline structure and may include framework metals other than aluminum (i.e., metal-substituted), but do not include silicoaluminophosphates (SAPOs). As used herein, the term "metal substituted" with respect to a zeolite means a framework having one or more aluminum or silicon framework atoms replaced by a substituting metal. In contrast, the term "metal exchanged" means a zeolite having extra-framework metal ions. Examples of metals suitable as substituting metals include copper and iron.

Suitable zeolites have a CHA crystalline structure. As used herein, distinction between zeolite type materials, such as naturally occurring (i.e. mineral) chabazite, and isotypes within the same Framework Type Code is not merely arbitrary, but reflects differences in the properties between the materials, which may in turn lead to differences in activity in the method of the present invention. Preferred zeolites for use in the present invention are synthetic zeolites because these zeolites have more uniform SAR, crystallite size, and crystallite morphology. Specific chabazite isotypes useful in the present invention include, but are not limited to, SSZ-13, LZ-218, Linde D, Linde R, Phi, and ZK-14, with SSZ-13 being preferred.

Preferred zeolites having a CHA crystal structure do not have an appreciable amount of phosphorous in their framework. That is, the zeolite CHA frameworks of the present invention do not have phosphorous as a regular repeating unit and/or do not have an amount of phosphorous that would affect the basic physical and/or chemical properties of the material, particularly with respect to the material's capacity to selectively reduce $NO_x$ over a broad temperature range. Accordingly, non-phosphorous CHA crystal structure may include crystalline structures having a de minimus amount of phosphorous.

Zeolites with application in the present invention can optionally include those that have been treated to improve hydrothermal stability. Conventional methods of improving hydrothermal stability include: (i) dealumination by steaming and acid extraction using an acid or complexing agent e.g. (EDTA—ethylenediaminetetracetic acid); treatment with acid and/or complexing agent; treatment with a gaseous stream of $SiCl_4$ (replaces Al in the zeolite framework with Si); and (ii) cation exchange—use of multi-valent cations such as lanthanum (La).

In preferred embodiments, the catalyst composition comprises molecular sieve crystals having a mean crystal size of greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. The crystals in the catalyst composition can be individual crystals, agglomeration of crystals, or a combination of both, provided that agglomeration of crystals have a mean particle size that is preferably less than about 15 µm, more preferably less than about 10 µm, and even more preferably less than about 5 µm. The lower limit on the mean particle size of the agglomeration is the composition's mean individual crystal size. In certain embodiments, large crystals are milled using a jet mill or other particle-on-particle milling technique to an average size of about 1.0 to about 1.5 micron to facilitate washcoating a slurry containing the catalyst to a substrate, such as a flow-through monolith.

Crystal size (also referred to herein as the crystal diameter) is the length of one edge of a face of the crystal. For example, the morphology of chabazite crystals is characterized by rhombohedral (but approximately cubic) faces wherein each edge of the face is approximately the same length. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of a straight edge are measured and recorded. (Particles that are clearly large polycrystalline aggregates should not be included the measurements.) Based on these measurements, the arithmetic mean of the sample crystal sizes is calculated.

Particle size of an agglomeration of crystals can be determined in a similar manner except that instead of measuring the edge of a face of an individual crystal, the length of the longest side of an agglomeration is measured. Other techniques for determining mean particle size, such as laser diffraction and scattering can also be used.

As used herein, the term "mean" with respect to crystal or particle size is intended to represent the arithmetic mean of a statistically significant sample of the population. For example, a catalyst comprising molecular sieve crystals having a mean crystal size of about 0.5 to about 5.0 µm is catalyst having a population of the molecular sieve crystals, wherein a statistically significant sample of the population (e.g., 50 crystals) would produce an arithmetic mean within the range of about 0.5 to about 5.0 µm.

In addition to the mean crystal size, catalyst compositions preferably have a majority of the crystal sizes are greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. Preferably, the first and third quartile of the sample of crystals sizes is greater than about 0.5 µm, preferably between about 0.5 and about 15 µm, such as about 0.5 to about 5 µm, about 0.7 to about 5 µm, about 1 to about 5 µm, about 1.5 to about 5.0 µm, about 1.5 to about 4.0 µm, about 2 to about 5 µm, or about 1 µm to about 10 µm. As used herein, the term "first quartile" means the value below which one quarter of the elements are located. For example, the first quartile of a sample of forty crystal sizes is the size of the tenth crystal when the forty crystal sizes are arranged in order from smallest to largest. Similarly, the term "third quartile" means that value below which three quarters of the elements are located.

Preferred CHA zeolites have a mole ratio of silica-to-alumina about 10 to about 25, more preferably from about 15 to about 20, and even more preferably from about 16 to about 18. The silica-to-alumina ratio of zeolites may be determined by conventional analysis. This ratio is meant to represent, as closely as possible, the ratio in the rigid atomic framework of the zeolite crystal and to exclude silicon or aluminum in the binder or, in cationic or other form, within the channels. It will be appreciated that it may be extremely difficult to directly measure the silica-to-alumina ratio of zeolite after it has been combined with a binder material. Accordingly, the silica-to-alumina ratio has been expressed hereinabove in term of the silica-to-alumina ratio of the parent zeolite, i.e., the zeolite used to prepare the catalyst, as measured prior to the combination of this zeolite with the other catalyst components.

CHA zeolites, particular SSZ-13, having a low SAR and large mean crystal size are commercially available. Alternatively, these materials can be synthesized by known processes in the art, such as those described in WO 2010/043981 (which is incorporated herein by reference) and WO 2010/074040 (which is incorporated herein by reference), or D. W. Fickel, et al., "Copper Coordination in Cu-SSZ-13 and Cu-SSZ-16 Investigated by Variable-Temperature XRD", *J Phys. Chem.*, 114, p. 1633-40 (2010), which demonstrates the synthesis of a copper-loaded SSZ-13 having an SAR of 12.

In addition to the aluminosilicate chabazite, the catalyst composition comprises a combination of at least one transition metal and at least one alkali or alkaline earth metal, wherein the transition metal(s) and alkali or alkaline earth metal(s) are disposed in the chabazite material as extra-framework metals. As used herein, an "extra-framework metal" is one that resides within the molecular sieve and/or on at least a portion of the molecular sieve surface, preferably as an ionic species, does not include aluminum, and does not include atoms constituting the framework of the molecular sieve. Preferably, the presence of the combination of transition metal(s) and the alkali or alkaline earth metal(s) in the zeolite material facilitates the treatment of exhaust gases, such as exhaust gas from a diesel engine, including processes such as $NO_x$ reduction and storage.

The transition metal may be any of the recognized catalytically active metals that are used in the catalyst industry to form metal-exchanged molecular sieves, particularly those metals that are known to be catalytically active in the treatment of exhaust gases from a combustion process, such as exhaust gas from a diesel engine, including metals useful in $NO_x$ reduction and storage processes. As used herein, the term transition metal ($T_M$) is broadly interpreted to include base metals ($B_M$) such as copper, nickel, zinc, iron, tungsten, molybdenum, cobalt, titanium, zirconium, manganese, chromium, vanadium, niobium, as well as tin, bismuth, and antimony; platinum group metals (PGMs), such as ruthenium, rhodium, palladium, indium, platinum, and precious metals such as gold and silver. Preferred transition metals are base metals, and preferred base metals include those selected from the group consisting of chromium, manganese, iron, cobalt, nickel, and copper, and mixtures thereof. In a preferred embodiment, at least one of the extra-framework metals is copper. Other preferred extra-framework metals include iron, particularly in combination with copper.

The alkali or alkaline earth metal (collectively $A_M$) can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. In certain embodiments, alkali metals are preferred. In certain embodiments, alkaline earth metals are preferred. Preferred alkali or alkaline earth metals include calcium, potassium, and combinations thereof. In certain embodiments, the catalyst composition is essentially free of magnesium and/or barium. In certain embodiments, the catalyst is essentially free of any alkali or alkaline earth metal except calcium and potassium. In certain embodiments, the catalyst is essentially free of any alkali or alkaline earth metal except calcium. And in certain other embodiments, the catalyst is essentially free of any alkali or alkaline earth metal except potassium. As used herein, the term "essentially free" means that the material does not have an appreciable amount of the particular metal. That is, the particular metal is not present in amount that would affect the basic physical and/or chemical properties of the material, particularly with respect to the material's capacity to selectively reduce or store $NO_R$.

In certain embodiments, the transition metal is present in the zeolite material at a concentration of about 0.1 to about 10 weight percent (wt %) based on the total weight of the molecular sieve, for example from about 0.5 wt % to about 5 wt %, from about 0.5 to about 1 wt %, from about 1 to about 5 wt %, about 2 wt % to about 4 wt %, and about 2 wt % to about 3 wt %. For embodiments which utilize copper, iron, or the combination thereof, the concentration of these transition metals in the zeolite material is preferably about 1 to about 5 weight percent, more preferably about 2 to about 3 weight percent.

In certain embodiments, the transition metal ($T_M$) is present in the zeolite material in an amount relative to the amount of aluminum in the zeolite, namely the framework aluminum. As used herein, the $T_M$:Al ratio is based on the relative molar amount of $T_M$ to molar framework Al in the corresponding zeolite. In certain embodiments, the catalyst material has a $T_M$:Al ratio of not more than about 0.5. In certain embodiments, the $T_M$:Al ratio is less than 0.25, for example about 0.10 to about 0.24, about 0.15 to about 0.24, or about 0.20 to about 0.22. A $T_M$:Al ratio of about 0.20 to about 0.24 is particularly useful where $T_M$ is copper, and more particularly where $T_M$ is copper and the SAR of the zeolite is about 15 to about 20. In certain embodiments that included exchanged copper, the copper is present in an amount from about 80 to about 120 $g/ft^3$ of zeolite or washcoat loading, including for example about 86 to about 94 $g/ft^3$, or about 92 to about 94 $g/ft^3$.

In certain embodiments, the alkali and/or alkaline earth metal ($A_M$) is present in the zeolite material in an amount relative to the amount of transition metal ($T_M$) in the zeolite. Preferably, the $T_M$ and $A_M$ are present, respectively, in a molar ratio of about 15:1 to about 1:1, for example about 10:1 to about 2:1, about 10:1 to about 3:1, or about 6:1 to about 4:1, particularly were $T_M$ is copper and $A_M$ is calcium.

In certain embodiments, the relative cumulative amount of transition metal ($T_M$) and alkali and/or alkaline earth metal ($A_M$) is present in the zeolite material in an amount relative to the amount of aluminum in the zeolite, namely the framework aluminum. As used herein, the ($T_M+A_M$):Al ratio is based on the relative molar amounts of $T_M+A_M$ to molar framework Al in the corresponding zeolite. In certain embodiments, the catalyst material has a ($T_M+A_M$):Al ratio of not more than about 0.6. In certain embodiments, the ($T_M+A_M$):Al ratio is not more than 0.5, for example about 0.05 to about 0.5, about 0.1 to about 0.4, or about 0.1 to about 0.2.

The extra-framework metals can be added to the molecular sieve via any known technique such as ion exchange, impregnation, isomorphous substitution, etc. The transition metal and the alkali or alkaline earth metal can be added to the zeolite material in any order (e.g., the transition metal can be exchanged before, after, or concurrently with the alkali or alkaline earth metal), but preferably the alkali or alkaline earth metal is added prior to or concurrently with the transition metal, particularly when the alkali earth metal is calcium and the transition metal is copper.

In one example, a metal-exchanged molecular sieve is created by blending the molecular sieve into a solution containing soluble precursors of the catalytically active metal(s). The pH of the solution may be adjusted to induce precipitation of the catalytically active cations onto or within the molecular sieve structure. For example, in a preferred embodiment a chabazite is immersed in a solution containing copper nitrate for a time sufficient to allow incorporation of the catalytically active copper cations into the molecular sieve structure by ion exchange. Un-exchanged copper ions are precipitated out. Depending on the application, a portion of the un-exchanged ions can remain in the molecular sieve material as free copper. The metal-exchanged molecular sieve may then be washed, dried and calcined. When iron and/or copper is used as the metal cation, the metal content of the catalytic material by weight preferably comprises from about 0.1 to about 10 percent by weight, more preferably from about 0.5 to about 10 percent by weight, for example about 1 to about 5 percent by weight or about 2 to about 3 percent by weight, based on the weight of the zeolite.

Generally, ion exchange of the catalytic metal cation into or on the molecular sieve may be carried out at room temperature or at a temperature up to about 80° C. over a period of about 1 to 24 hours at a pH of about 7. The resulting catalytic molecular sieve material is preferably dried at about 100 to 120° overnight and calcined at a temperature of at least about 500° C.

In certain embodiments, the metal promoted zeolite catalysts of the present invention also contain a relatively large amount of Ce. In certain embodiments, the zeolite, preferably a CHA aluminosilicate, has an SAR of less than 20, preferably about 15 to about 18, and is promoted with a metal, preferably copper and preferably in a copper:aluminum atomic ratio of about 0.17 to about 0.24, and also contains Ce in a concentration of greater than about 1 weight percent, preferably greater than about 1.35 weight percent, more preferably 1.35 to 13.5 weight percent, based on the total weight of the zeolite. Such Ce-containing catalysts are more durable compared to structurally similar catalysts, such as other CHA zeolites having a higher SAR, particularly those with higher loadings of transition metals.

Preferably, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite. For most of these ranges, the improvement in catalyst performance correlates directly to the concentration of Ce in the catalyst. These ranges are particularly preferred for copper promoted aluminosilicates having a CHA framework, such as SSZ-13, with an SAR of about 10 to about 25, about 20 to about 25, about 15 to about 20, or about 16 to about 18, and more preferably for such embodiments, wherein the copper is present in a copper-to-aluminum ratio of about 0.17 to about 0.24.

In certain embodiments, the cerium concentration in the catalyst material is about 50 to about 550 $g/ft^3$. Other ranges of Ce include: above 100 $g/ft^3$, above 200 $g/ft^3$, above 300 $g/ft^3$, above 400 $g/ft^3$, above 500 $g/ft^3$, from about 75 to about 350 $g/ft^3$, from about 100 to about 300 $g/ft^3$, and from about 100 to about 250 $g/ft^3$.

In certain embodiments, the concentration of Ce exceeds the theoretical maximum amount available for exchange on the metal-promoted zeolite. Accordingly, in some embodiments, Ce is present in more than one form, such as Ce ions, monomeric ceria, oligomeric ceria, and combinations thereof, provided that said oligomeric ceria has a mean crystal size of less than 5 μm, for example less than 1 μm, about 10 nm to about 1 μm, about 100 nm to about 1 μm, about 500 nm to about 1 μm, about 10 to about 500 nm, about 100 to about 500 nm, and about 10 to about 100 nm. As used herein, the term "monomeric ceria" means $CeO_2$ as individual molecules or moieties residing freely on and/or in the zeolite or weakly bonded to the zeolite. As used herein, the term "oligomeric ceria" means nanocrystalline $CeO_2$ residing freely on and/or in the zeolite or weakly bonded to the zeolite.

For embodiments in which the catalyst is part of a washcoat composition, the washcoat may further comprise binder containing Ce or ceria. For such embodiments, the Ce containing particles in the binder are significantly larger than the Ce containing particles in the catalyst.

Cerium is preferably incorporated into a zeolite containing a promoting metal. For example, in a preferred embodiment, an aluminosilicate having a CHA framework undergoes a copper exchange process prior to being impregnated by Ce. An exemplary Ce impregnation process involves adding Ce nitrate to a copper promoted zeolite via a conventional incipient wetness technique.

The zeolite catalyst for use in the present invention can be in the form of a washcoat, preferably a washcoat that is suitable for coating a substrate, such as a metal or ceramic flow through monolith substrate or a filtering substrate, including for example a wall-flow filter or sintered metal or partial filter. Accordingly, another aspect of the invention is a washcoat comprising a catalyst component as described herein. In addition the catalyst component, washcoat compositions can further comprise a binder selected from the group consisting of alumina, silica, (non-zeolite) silica-alumina, naturally occurring clays, $TiO_2$, $ZrO_2$, and $SnO_2$.

In one embodiment, provided is a substrate upon which the zeolite catalyst is deposited.

Preferred substrates for use in mobile application are monoliths having a so-called honeycomb geometry which comprises a plurality of adjacent, parallel channels, each channel typically having a square cross-sectional area. The honeycomb shapes provide a large catalytic surface with minimal overall size and pressure drop. The zeolite catalyst can be deposited on a flow-through monolith substrate (e.g., a honeycomb monolithic catalyst support structure with many small, parallel channels running axially through the entire part) or filter monolith substrate such as a wall-flow filter, etc. In another embodiment, the zeolite catalyst is formed into an extruded-type catalyst. Preferably, the zeolite catalyst is coated on a substrate in an amount sufficient to reduce the $NO_x$ contained in an exhaust gas stream flowing through the substrate. In certain embodiments, at least a portion of the substrate may also contain a platinum group metal, such as platinum (Pt), to oxidize ammonia in the exhaust gas stream.

Preferably, the molecular sieve catalyst is embodied in or on a substrate in an amount sufficient to reduce the $NO_x$ contained in an exhaust gas stream flowing through the substrate. In certain embodiments, at least a portion of the substrate may also contain an oxidation catalyst, such as a platinum group metal (e.g. platinum), to oxidize ammonia in the exhaust gas stream or perform other functions such as conversion of CO into $CO_2$.

The catalytic zeolites described herein can promote the reaction of a reductant, preferably ammonia, with nitrogen oxides to selectively form elemental nitrogen ($N_2$) and water ($H_2O$) vis-à-vis the competing reaction of oxygen and ammonia. In one embodiment, the catalyst can be formulated to favor the reduction of nitrogen oxides with ammonia (i.e., and SCR catalyst). In another embodiment, the catalyst can be formulated to favor the oxidation of ammonia with oxygen (i.e., an ammonia oxidation (AMOX) catalyst). In yet another embodiment, an SCR catalyst and an AMOX catalyst are used in series, wherein both catalyst comprise the metal containing zeolite described herein, and wherein the SCR catalyst is upstream of the AMOX catalyst. In certain embodiments, the AMOX catalyst is disposed as a top layer on an oxidative under-layer, wherein the under-layer comprises a platinum group metal (PGM) catalyst or a non-PGM catalyst. Preferably, the AMOX catalyst is disposed on a high surface area support, including but not limited to alumina. In certain embodiments, the AMOX catalyst is applied to a substrate, preferably substrates that are designed to provide large contact surface with minimal backpressure, such as flow-through metallic or cordierite honeycombs. For example, a preferred substrate has between about 25 and about 300 cells per square inch (CPSI) to ensure low backpressure. Achieving low backpressure is particularly important to minimize the AMOX catalyst's effect on the low-pressure EGR performance. The AMOX catalyst can be applied to the substrate as a washcoat, preferably to achieve a loading of about 0.3 to 3.5 $g/in^3$. To provide further $NO_x$ conversion, the front part of the substrate can be coated with just SCR coating, and the rear coated with SCR and an $NH_3$ oxidation catalyst which can further include Pt or Pt/Pd on an alumina support.

According to another aspect of the invention, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds in the gas. In one embodiment, nitrogen oxides are reduced with the reducing agent at a temperature of at least 100° C. In another embodiment, the nitrogen oxides are reduced with the reducing agent at a temperature from about 150° C. to 750° C. In a particular embodiment, the temperature range is from 175 to 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C. Embodiments utilizing temperatures greater than 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter. In other embodiments, the zeolite SCR catalyst is incorporated on a filter substrate. Methods of the present invention may comprise one or more of the following steps: (a) accumulating and/or combusting soot that is in contact with the inlet of a catalytic filter; (b) introducing a nitrogenous reducing agent into the exhaust gas stream prior to contacting the catalytic filter, preferably with no intervening catalytic steps involving the treatment of $NO_x$ and the reductant; (c) generating $NH_3$ over a $NO_x$ adsorber catalyst, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more flow-through SCR catalyst device(s) in the presence of a reducing agent to reduce the $NO_x$ concentration in the exhaust gas; and (f) contacting the exhaust gas with an AMOX catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

The reductant (also known as a reducing agent) for SCR processes broadly means any compound that promotes the reduction of $NO_x$ in an exhaust gas. Examples of reductants useful in the present invention include ammonia, hydrazine or any suitable ammonia precursor, such as urea $((NH_2)_2CO)$, ammonium carbonate, ammonium carbamate, ammonium hydrogen carbonate or ammonium formate, and hydrocarbons such as diesel fuel, and the like. Particularly preferred reductant, are nitrogen based, with ammonia being particularly preferred.

In another embodiment, all or at least a portion of the nitrogen-based reductant, particularly $NH_3$, can be supplied by a $NO_x$ adsorber catalyst (NAC), a lean $NO_x$ trap (LNT), or a $NO_x$ storage/reduction catalyst (NSRC), disposed upstream of the SCR catalyst, e.g., a SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 $g/ft^3$, such as 20 to 60 $g/ft^3$. Alternatively, the precious metal of the catalyst is characterized by the average concentration which may be from about 40 to about 100 $grams/ft^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method can be performed on a gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

According to a further aspect, the invention provides an exhaust system for a vehicular lean burn internal combustion engine, which system comprising a conduit for carrying a flowing exhaust gas, a source of nitrogenous reductant, a zeolite catalyst described herein. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In a particular embodiment, metering is controlled in response to the quantity of nitrogen oxides in the exhaust gas determined either directly (using a suitable $NO_x$ sensor) or indirectly, such as using pre-correlated look-up tables or maps—stored in the control means—correlating any one or more of the abovementioned inputs indicative of a condition of the engine with predicted $NO_x$ content of the exhaust gas. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$. The control means can comprise a pre-programmed processor such as an electronic control unit (ECU).

In a further embodiment, an oxidation catalyst for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In a further embodiment, a suitable filter substrate is located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

In a further embodiment, the zeolite catalyst for use in the present invention is coated on a filter located downstream of the oxidation catalyst. Where the filter includes the zeolite catalyst for use in the present invention, the point of metering the nitrogenous reductant is preferably located between the oxidation catalyst and the filter.

In a further aspect, there is provided a vehicular lean-burn engine comprising an exhaust system according to the present invention. The vehicular lean burn internal combustion engine can be a diesel engine, a lean-burn gasoline engine or an engine powered by liquid petroleum gas or natural gas.

EXAMPLES

Example 1 (a-g): Preparation and $NO_x$ Performance of Alkali and Alkaline Metal Catalyst (a) Approximately 600 g of synthetic, dehydrated H-chabazite (isotype SSZ-13) powder, having an SAR of about 17 and an alkali metal concentration of less than about 0.1 weight percent, was immersed in a solution containing 0.129 M copper acetate and 0.212 M calcium acetate for about 4 hours at a temperature of about 25° C. to allow incorporation of the catalytically active copper and calcium cations into the molecular sieve structure of the chabazite by ion exchange. The unexchanged ions were allowed to precipitate out and the remaining calcium/copper exchanged chabazite was washed and dried for about 8 hours at 80° C. The resulting product was a zeolite powder having about 2.4 weight percent exchanged copper and about 0.3 weight percent exchanged calcium.

(b) The general procedure in Example (1)(a) was repeated except that the solution into which the chabazite was immersed contained 0.218 M potassium acetate, instead of calcium acetate. The resulting product was a zeolite powder having about 2.4 weight percent exchanged copper and about 2 weight percent exchanged potassium.

(c) The general procedure in Example (1)(a) was repeated except that the solution into which the chabazite was immersed contained 3.04 M magnesium nitrate hexahydrate, instead of calcium acetate. The resulting product was a zeolite powder having about 2.4 weight percent exchanged copper and about 0.6 weight percent exchanged magnesium.

(d) The general procedure in Example (1)(a) was repeated except that the solution into which the chabazite was immersed contained 0.216 M sodium nitrate, instead of calcium acetate. The resulting product was a zeolite powder having about 2.4 weight percent exchanged copper and about 1.15 weight percent exchanged sodium.

(e) The general procedure in Example (1)(a) was repeated except that the solution into which the chabazite was immersed contained 0.104 M strontium acetate, instead of calcium acetate. The resulting product was a zeolite powder having about 2.4 weight percent exchanged copper and about 0.81 weight percent exchanged potassium.

(f) The general procedure in Example (1)(a) was repeated except that the solution into which the chabazite was immersed contained 0.218 M cesium acetate, instead of calcium acetate. The resulting product was a zeolite powder having about 2.4 weight percent exchanged copper and about 6.6 weight percent exchanged cesium.

(g) The general procedure in Example (1)(a) was repeated except that the solution into which the chabazite was immersed contained about 3 M manganese nitrate, instead of calcium acetate. The resulting product was a zeolite powder having about 2.4 weight percent exchanged copper and about 0.6 weight percent exchanged manganese.

A first portion of each powder sample was keep as a fresh (i.e., not hydrothermally aged) sample. A second portion of each powder sample was hydrothermally aged at 750° C. in 10% moisture for 80 hours. A third portion of each powder sample was hydrothermally aged at 900° C. in 4.5% moisture for 4 hours.

The fresh and aged samples described in Examples (1)(a)-(g) were separately exposed to a simulated diesel engine exhaust gas that was combined with ammonia to produce a stream having an ammonia to $NO_x$ ratio (ANR) of about 1. The $NO_x$ conversion data for the 750° C. aged samples is provided in FIG. 1. And the NOx conversion data for the 900° C. aged samples is provided in FIG. 2.

Figure 2:
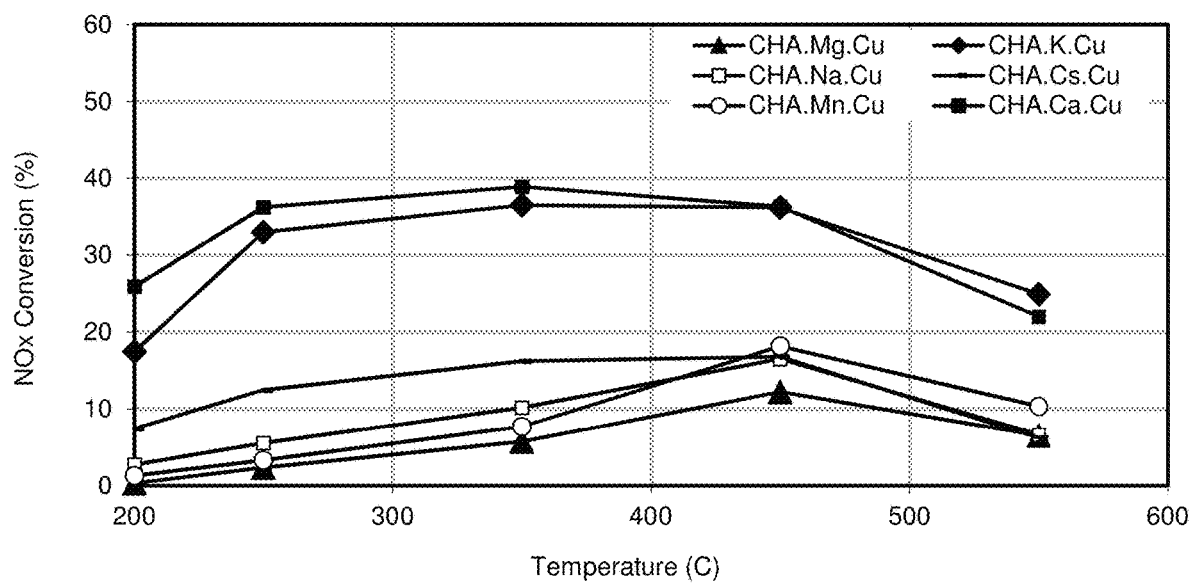
FIG. 2 is a graph depicting $NO_x$ conversion data for certain embodiment of the invention, wherein the catalyst is hydrothermally aged at 900° C.

The NOx conversion performance of the metal-exchanged chabazites without aging (i.e., fresh) were comparable to each other and to a similar copper exchanged chabazite without an exchanged alkali or alkaline earth metal. However, the data in FIG. 1 shows that $NO_x$ conversion performance of the metal-exchanged chabazites after hydrothermal aging at 750° C. was superior to the $NO_x$ conversion performance of a similar copper exchanged chabazite without an exchanged alkali or alkaline earth metal. The data in FIG. 2 further shows that when the samples are hydrothermally aged at 900° C., the calcium/copper exchanged zeolites and the potassium/copper exchanged zeolites are more stable compared to other alkali and alkaline earth metals.

Example 2 (a-b) h: Effect of Order of Metal Addition on $NO_x$ Performance (a) The procedure in Example (1)(a) was repeated except that the chabazite powder was first exchanged with copper and subsequently with calcium to produce a zeolite powder having about 2.4 weight percent exchanged copper and about 1 weight percent exchanged calcium. A portion of the powder sample was hydrothermally aged at 500° C. for 2 hours and another portion of the powder sample was hydrothermally aged at 800° C. for 16 hours.

(b) The procedure in Example (1)(a) was repeated except that the chabazite powder was first exchanged with calcium and subsequently with copper to produce a zeolite powder having about 2.4 weight percent exchanged copper and about 1 weight percent exchanged calcium. A portion of the powder sample was hydrothermally aged at 500° C. for 2 hours and another portion of the powder sample was hydrothermally aged at 800° C. for 16 hours.

The samples described in Examples (2)(a) and (b) were separately exposed to a simulated diesel engine exhaust gas that was combined with ammonia to produce a stream having an ammonia to $NO_x$ ratio (ANR) of about 1. The catalyst's capacity for $NO_x$ conversion was determined at temperatures ranging from 150° C. to 550° C. The $NO_x$ conversion was approximately the same for each comparably aged material within a temperature window of about 10° C. Thus, the results indicate that the order of addition of the calcium and copper is not a major factor affecting the materials ability to reduce $NO_x$ in an exhaust gas.

Example 3 (a-c): $NO_x$ Performance as a Function of Calcium Loading (a) The procedure in Example (2)(b) was repeated to produce an aluminosilicate zeolite powder having about 2.4 weight percent exchanged copper and about 1 weight percent exchanged calcium. A portion of the powder sample was hydrothermally aged at 500° C. for 2 hours and another portion of the powder sample was hydrothermally aged at 800° C. for 16 hours.

(b) The procedure in Example (2)(b) was repeated except that the resulting product was an aluminosilicate zeolite powder having about 2.4 weight percent exchanged copper and about 2 weight percent exchanged calcium. A portion of the powder sample was hydrothermally aged at 500° C. for 2 hours and another portion of the powder sample was hydrothermally aged at 800° C. for 16 hours.

(c) The procedure in Example (2)(b) was repeated except that the resulting product was an aluminosilicate zeolite powder having about 2.4 weight percent exchanged copper and about 3 weight percent exchanged calcium. A portion of the powder sample was hydrothermally aged at 500° C. for 2 hours and another portion of the powder sample was hydrothermally aged at 800° C. for 16 hours.

The samples described in Examples (3)(a)-(c) are summarized in Table 1 below. For each sample, provided are exchanged copper to framework aluminum mole ratio, exchanged calcium to framework aluminum mole ratio, and the mole ratio of the sum of the exchanged copper and calcium to framework aluminum.

TABLE 1

| Sample | [Cu] wt. % | [Ca] wt. % | Cu:Al mole ratio | Ca:Al mole ratio | (Cu + Ca):Al mole ratio |
|---|---|---|---|---|---|
| 3a | 2.4 | 1 | 0.21 | 0.14 | 0.35 |
| 3b | 2.4 | 2 | 0.21 | 0.28 | 0.49 |
| 3c | 2.4 | 3 | 0.21 | 0.42 | 0.63 |

Figure 3:
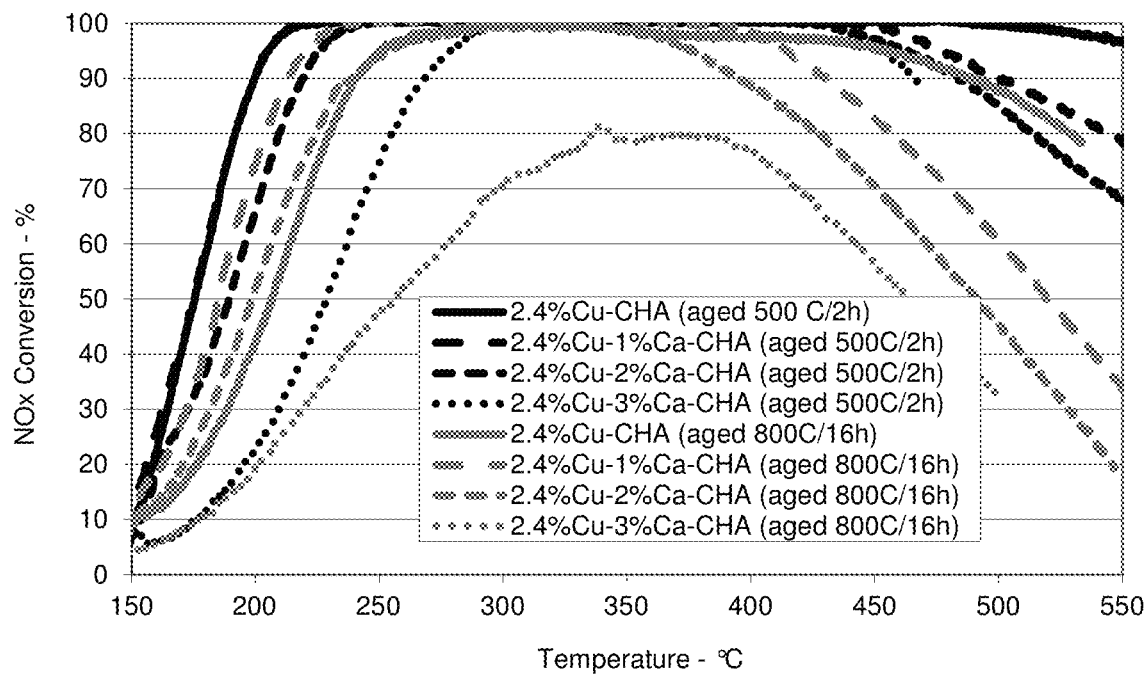
FIG. 3 is graph depicting $NO_x$ conversion data for certain embodiments of the invention, wherein the catalyst is loaded with different amounts of calcium.

The samples described in Examples (3)(a)-(c) were separately exposed to a simulated diesel engine exhaust gas that was combined with ammonia to produce a stream having an ammonia to $NO_x$ ratio (ANR) of about 1. The catalyst's capacity for $NO_x$ conversion was determined at temperatures ranging from 150° C. to 550° C. The $NO_x$ conversion data for the samples are provided in FIG. 3. Here, the data shows that the addition of up to about 2 weight percent calcium improves the NOx conversion performance of the base material.

Example 4 (a-e): Comparative Tests of Cu:Ca Ratio at Constant Metal:Al Ratio (a) The procedure in Example (2)(b) was repeated to produce an aluminosilicate zeolite powder having about 2 weight percent exchanged copper and about 1.3 weight percent exchanged calcium. A portion of the powder sample was kept as "fresh" and another portion was hydrothermally aged at 500° C. for 2 hours. The mole ratio of copper to the total exchanged metal (i.e., Cu+Ca) was 0.50. The mole ratio of the total exchanged metal to framework aluminum in the zeolite was 0.35.

(b) The procedure in Example (2)(b) was repeated to produce an aluminosilicate zeolite powder having about 2.4 weight percent exchanged copper and about 1 weight percent exchanged calcium. A portion of the powder sample was kept as "fresh" and another portion was hydrothermally aged at 500° C. for 2 hours. The mole ratio of copper to the total exchanged metal (i.e., Cu+Ca) was 0.60. The mole ratio of the total exchanged metal to framework aluminum in the zeolite was 0.35.

(c) The procedure in Example (2)(b) was repeated to produce an aluminosilicate zeolite powder having about 3 weight percent exchanged copper and about 0.6 weight percent exchanged calcium. A portion of the powder sample was kept as "fresh" and another portion was hydrothermally aged at 500° C. for 2 hours. The mole ratio of copper to the total exchanged metal (i.e., Cu+Ca) was 0.76. The mole ratio of the total exchanged metal to framework aluminum in the zeolite was 0.35.

(d) The procedure in Example (2)(b) was repeated to produce an aluminosilicate zeolite powder having about 3.5 weight percent exchanged copper and about 0.3 weight percent exchanged calcium. A portion of the powder sample was kept as "fresh" and another portion was hydrothermally aged at 500° C. for 2 hours. The mole ratio of copper to the total exchanged metal (i.e., Cu+Ca) was 0.88. The mole ratio of the total exchanged metal to framework aluminum in the zeolite was 0.35.

(e) The procedure in Example (2)(b) was repeated to produce an aluminosilicate zeolite powder having about 4 weight percent exchanged copper and no exchanged calcium. A portion of the powder sample was kept as "fresh" and another portion was hydrothermally aged at 500° C. for 2 hours. The mole ratio of the total exchanged metal to framework aluminum in the zeolite was 0.35.

The samples described in Examples (4)(a)-(e) are summarized in Table 2 below.

TABLE 2

| Sample | [Cu] wt. % | [Ca] wt. % | Cu:(Cu + Ca) mole ratio | (Cu + Ca):Al mole ratio |
|---|---|---|---|---|
| 4a | 2 | 1.3 | 0.5 | 0.35 |
| 4b | 2.4 | 1 | 0.6 | 0.35 |
| 4c | 3 | 0.6 | 0.76 | 0.35 |
| 4d | 3.5 | 0.3 | 0.88 | 0.35 |
| 4e | 4 | 0 | 1.00 | 0.35 |

Figure 4:
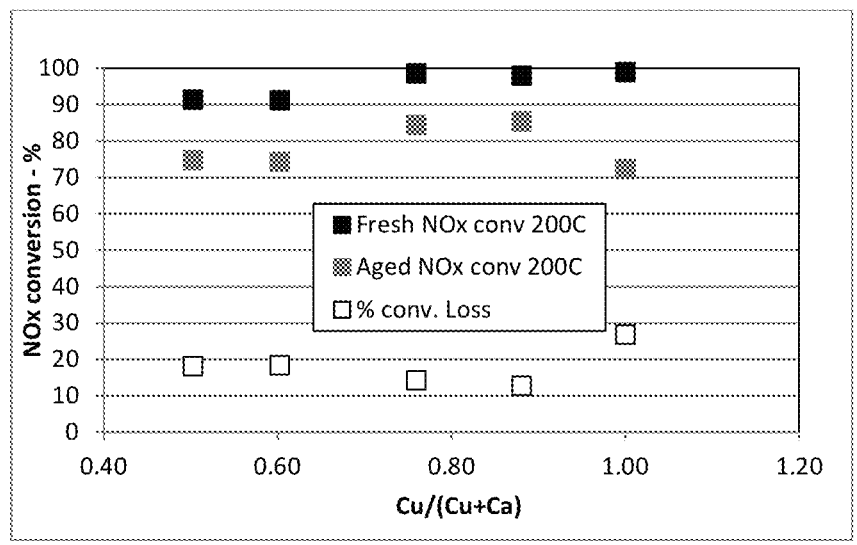
FIG. 4 is a graph depicting $NO_x$ conversion data for certain embodiments of the invention, wherein the catalyst is loaded with different amounts of calcium and copper, but keeping the total exchanged metal concentration constant.

The samples described in Examples (4)(a)-(e) were separately exposed to a simulated diesel engine exhaust gas that was combined with ammonia to produce a stream having an ammonia to $NO_x$ ratio (ANR) of about 1. The catalyst's capacity for $NO_x$ conversion was determined at a similar temperature. The $NO_x$ conversion data for the samples is provided in FIG. 4. Here, the data shows that the presence of calcium with copper is more stabilizing than only copper, even at the same exchanged metal-to-framework aluminium ratio, which was below the exchange capacity of the zeolite.

Example 5 (a-f): $N_2O$ Formation as a Function of Operating Temperature (a) The procedure in Example (2)(b) was repeated to produce an aluminosilicate zeolite powder having about 2.4 weight percent exchanged copper and about 1 weight percent exchanged calcium. A portion of the powder sample was hydrothermally aged at 500° C. for 2 hours and another portion of the powder sample was hydrothermally aged at 800° C. for 16 hours.

(b) The procedure in Example (2)(b) was repeated except that the resulting product was an aluminosilicate zeolite powder having about 2.4 weight percent exchanged copper and about 2 weight percent exchanged calcium. A portion of the powder sample was hydrothermally aged at 500° C. for 2 hours and another portion of the powder sample was hydrothermally aged at 800° C. for 16 hours.

Figure 5:
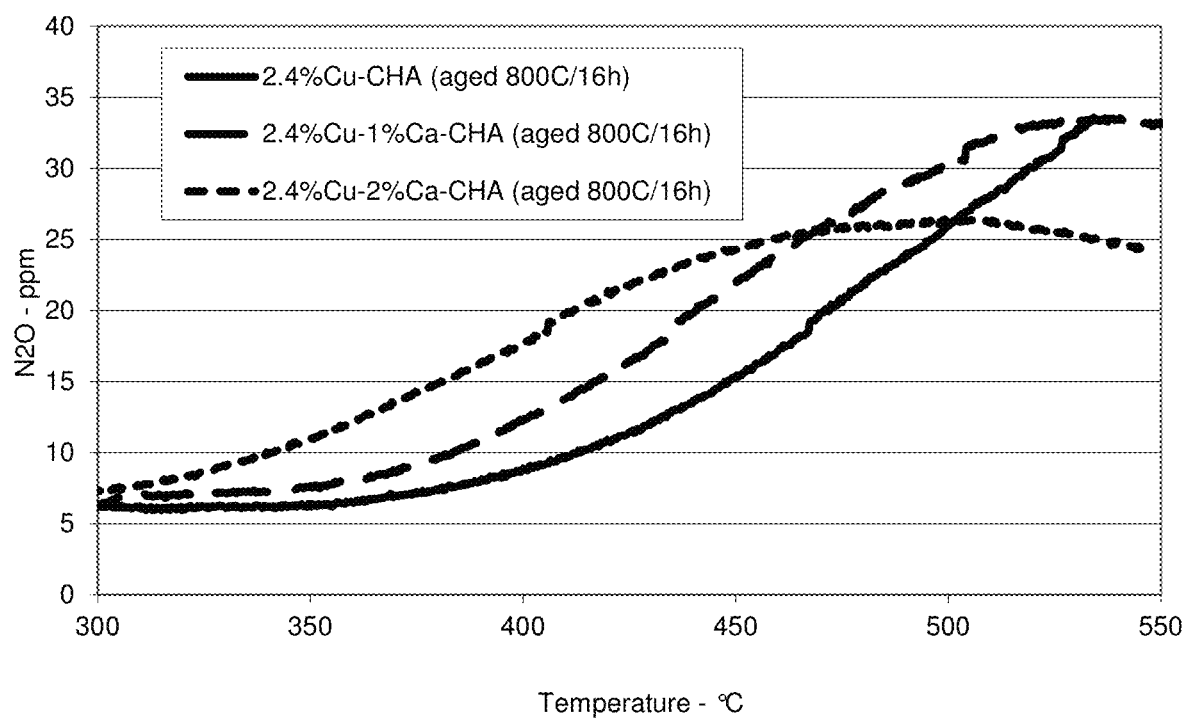
FIG. 5 is a graph depicting $N_2O$ production data for certain embodiments of the invention.

The samples described in Examples (4)(a)-(b) were separately exposed to a simulated diesel engine exhaust gas that was combined with ammonia to produce a stream having an ammonia to $NO_x$ ratio (ANR) of about 1. Generation of $N_2O$ over the catalyst was determined at temperatures ranging from 150° C. to 550° C. The data in FIG. 5 shows that the presence of calcium with copper results in less $N_2O$ being generated at SCR operating temperature above 500° C., and particularly above 550° C., compared to a similar chabazite loaded with copper only.

What is claimed is:

1. A catalyst composition comprising:
   a. an aluminosilicate zeolite material comprising silica and alumina in a CHA framework and having a silica-to-alumina mole ratio (SAR) of about 10 to about 25;
   b. about 1 to about 5 weight percent of a base metal ("$B_M$"), based on the total weight of the zeolite material, wherein said base metal disposed in said zeolite material as free and/or extra-framework exchanged metal, and
   c. an alkali or alkaline earth metal (collectively "$A_M$") disposed in said zeolite material as free and/or extra-framework exchanged metal,
   wherein the $B_M$ and $A_M$ are present, respectively, in a molar ratio of about 15:1 to about 1:1, and
   d. about 1 to about 10 weight percent of cerium in said zeolite material, based on the total weight of the zeolite, wherein said cerium is present in a form selected from exchanged cerium ions, monomeric ceria, oligomeric ceria, and combinations thereof, provided that said oligomeric ceria has a particle size of less than 5 µm.

2. The catalyst of claim 1, wherein the alumina contains aluminum (Al) that is part of the zeolite framework and the catalyst composition has a ($B_M$+$A_M$):Al mole ratio of about 0.1 to about 0.4.

3. The catalyst of claim 2, wherein a molar ratio of $B_M$ to Al is less than 0.25:1.

4. The catalyst of claim 2, wherein a molar ratio of $B_M$ to $A_M$ is about 10:1 to about 3:1.

5. The catalyst of claim 2, wherein said aluminosilicate zeolite material has an SAR of about 15 to about 20 and a $B_M$:Al mole ratio of about 0.1 to about 0.24.

6. The catalyst of claim 1, wherein said base metal is selected from chromium, manganese, iron, cobalt, nickel, and copper, and mixtures thereof.

7. The catalyst of claim 1, wherein said alkali or alkaline earth metal is an alkali metal selected from the group consisting of Na, K, Rb, and Cs.

8. The catalyst of claim 1, wherein said alkali or alkaline earth metal is an alkaline earth metal selected from the group consisting of Mg, Ca, Sr, and Ba.

9. The catalyst of claim 4, wherein said base metal is selected from the group consisting of Cu, Fe, and combinations thereof, said alkali or alkaline earth metal is selected from the group consisting of Ca, K, and combinations thereof, and a $B_M$:Al are present in a molar ratio about 0.17 to about 0.24.

10. The catalyst of claim 8, wherein said base metal is Cu and said alkali metal is Ca.

11. The catalyst of claim 8, wherein said base metal is Cu and said alkali metal is K.

12. The catalyst composition of claim 8, wherein said zeolite is an SSZ-13 isotype.

13. The catalyst composition of claim 3, wherein said zeolite has a mean crystal size of about 1 µm to about 5 µm.

14. The catalyst composition of claim 1, wherein said catalyst composition is substantially free of Zr, ZrO, Ti, and TiO.

15. A catalytically active washcoat comprising:
   a. a catalyst composition according to claim 1, and
   b. one or more stabilizers and/or binders selected from ceria, alumina, silica, (non-zeolite) silica-alumina, naturally occurring clays, $TiO_2$, $ZrO_2$, and $SnO_2$
   wherein the catalyst composition and the one or more stabilizers and/or binders are present together in a slurry.

16. A catalyst article comprising:
   a. a catalyst composition according to claim 1, and
   b. a substrate,
   wherein the catalyst composition is disposed on the surface of the substrate, permeates at least a portion of the substrate, or a combination thereof.

17. The catalyst article of claim 16, wherein said substrate is a flow-through monolith.

18. The catalyst article of claim 16, wherein said substrate is a wall-flow monolith.

19. A method for reducing $NO_x$ in an exhaust gas comprising:
   contacting an exhaust gas stream derived from a lean-burn combustion process and containing $NO_x$ and a reducing agent with a catalyst composition according to claim 1; and converting at a portion of said $NO_x$ to $N_2$ and $H_2O$.

* * * * *